US012474685B2

(12) United States Patent
Curry et al.

(10) Patent No.: US 12,474,685 B2
(45) Date of Patent: Nov. 18, 2025

(54) METHOD OF MACHINING ARTICLES FROM A SUPERHARD DISC

(71) Applicant: Element Six Limited, County Clare (IE)

(72) Inventors: Eric Curry, County Clare (IE); James McNamara, County Clare (IE)

(73) Assignee: Element Six Limited, County Clare (IE)

( * ) Notice: Subject to any disclaimer, the term of this patent is extended or adjusted under 35 U.S.C. 154(b) by 406 days.

(21) Appl. No.: 17/998,762

(22) PCT Filed: May 14, 2021

(86) PCT No.: PCT/EP2021/062867
§ 371 (c)(1),
(2) Date: Nov. 14, 2022

(87) PCT Pub. No.: WO2021/229071
PCT Pub. Date: Nov. 18, 2021

(65) Prior Publication Data
US 2024/0012381 A1    Jan. 11, 2024

(30) Foreign Application Priority Data

May 15, 2020    (GB) ...................................... 2007251

(51) Int. Cl.
*G05B 19/401*    (2006.01)
*G05B 19/408*    (2006.01)

(52) U.S. Cl.
CPC ....... *G05B 19/401* (2013.01); *G05B 19/4083* (2013.01); *G05B 2219/32222* (2013.01); *G05B 2219/37269* (2013.01)

(58) Field of Classification Search
None
See application file for complete search history.

(56) References Cited

U.S. PATENT DOCUMENTS

| 2005/0210755 A1* | 9/2005 | Cho ........................ B23P 15/28 51/293 |
| 2011/0231001 A1* | 9/2011 | Susnjara ............ G05B 19/4097 700/110 |

(Continued)

FOREIGN PATENT DOCUMENTS

| CN | 211074276 U | 7/2020 |
| EP | 1321839 A2 | 6/2003 |

(Continued)

OTHER PUBLICATIONS

United Kingdom Patent Application No. GB2007251.8, Combined Search and Examination Report dated Nov. 13, 2020, 6 pages.

(Continued)

*Primary Examiner* — David Earl Ogg
(74) *Attorney, Agent, or Firm* — Kilpatrick Townsend & Stockton LLP

(57) ABSTRACT

This disclosure relates to a method of machining articles from a disc comprising superhard material, such as polycrystalline diamond (PCD) or polycrystalline cubic boron nitride (PCBN). The method includes providing a disc having a diameter of no more than 100 mm and a thickness of no more than 10 mm, providing a nesting pattern, scanning the disc to identify and locate any flaws in the disc and subsequently creating a machining program that takes into account said flaws.

16 Claims, 3 Drawing Sheets

(56) References Cited

U.S. PATENT DOCUMENTS

| | | | | |
|---|---|---|---|---|
| 2013/0283706 A1* | 10/2013 | Naidoo | ............... | E21B 10/46 |
| | | | | 51/309 |
| 2013/0307174 A1* | 11/2013 | Lindgren | ............ | B23Q 9/0014 |
| | | | | 264/40.1 |
| 2015/0259987 A1* | 9/2015 | Can | ..................... | E21B 10/567 |
| | | | | 175/426 |

FOREIGN PATENT DOCUMENTS

| | | | |
|---|---|---|---|
| EP | 2168742 | A1 | 3/2010 |
| JP | S62284887 | A | 12/1987 |
| JP | 2001215218 | A | 8/2001 |
| JP | 2001255314 | A | 9/2001 |
| JP | 2008123275 | A * | 5/2008 |
| JP | 2008152573 | A * | 7/2008 |
| JP | 2008197003 | A | 8/2008 |
| JP | 2011-099723 | | 5/2011 |
| WO | 9916595 | A1 | 4/1999 |
| WO | 03070416 | A1 | 8/2003 |

OTHER PUBLICATIONS

United Kingdom Patent Application No. GB2106930.7, Search Report dated Nov. 8, 2021, 4 pages.
International Patent Application No. PCT/EP2021/062867, International Search Report and Written Opinion dated Aug. 18, 2021, 12 pages.

\* cited by examiner

METHOD OF MACHINING ARTICLES FROM A SUPERHARD DISC

FIELD OF THE INVENTION

This invention relates to a method of machining articles from a superhard disc, and in particular to a nesting method for a machine apparatus capable of machining efficiently with minimal spoilage.

BACKGROUND

Cutter inserts for machining and other tools typically comprise a layer of polycrystalline diamond (PCD) bonded to a cemented carbide substrate. PCD is an example of a 'superhard' material, also called super abrasive material, which has a hardness value substantially greater than that of cemented tungsten carbide. Superhard materials have a Vickers hardness greater than 40 GPa.

Components comprising PCD are used in a wide variety of tools for cutting, machining, drilling or degrading hard or abrasive materials such as rock, metal, ceramics, composites and wood-containing materials. PCD typically comprises a mass of substantially inter-grown cubic diamond grains forming a skeletal mass, which defines interstices between the cubic diamond grains. PCD material comprises at least about 80 volume % of diamond and can be made by subjecting an aggregated mass of diamond grains to an ultra-high pressure of greater than about 5 GPa, typically about 5.5 GPa, and temperature of at least about 1200° C., typically about 1440° C., in the presence of a sintering aid, also referred to as a catalyst material for diamond. This sintering process takes place within a high temperature, high pressure (HPHT) capsule, placed within a HPHT press.

Catalyst material for diamond is understood to be material that is capable of promoting direct inter-growth of diamond grains at a pressure and temperature condition at which diamond is thermodynamically more stable than graphite. Examples of catalyst materials for diamond are cobalt, iron, nickel and certain alloys including alloys of any of these elements.

PCD may be free-standing or backed. PCD may be formed on a cobalt-cemented tungsten carbide substrate, which may provide a source of cobalt catalyst material for the PCD. During sintering of the body of PCD material, a constituent of the cemented-carbide substrate, such as cobalt from a cobalt-cemented tungsten carbide substrate, liquefies and sweeps from a region adjacent the volume of diamond particles into interstitial regions between the diamond particles. In this example, the cobalt acts as a catalyst to facilitate the formation of bonded diamond grains. Optionally, a metal-solvent catalyst may be mixed with diamond particles prior to subjecting the diamond particles and substrate to HPHT sintering conditions. The interstices within PCD material may at least partly be filled with the catalyst material. The inter-grown diamond structure therefore comprises original diamond grains as well as a newly precipitated or re-grown diamond phase, which bridges the original grains. In the final sintered structure, catalyst/solvent material generally remains present within at least some of the interstices that exist between the sintered diamond grains.

At the time of sintering, the optimum sintering temperature is set according to the properties of the desired final PCD sintered body. At this time, if the sintering temperature is too low or high, the properties of the PCD sintered body, such as impact resistance and abrasion resistance, are out of the range of the desired properties, resulting in product defects.

Typically, the PCD sintered body ex-press is cylindrical, and discs with a circular cross-section (standard diameter) are subsequently diced from the sintered body. PCD is usually supplied to tool makers in the form of a backed polished disc. The tool makers remove articles (e.g. tool blanks) according to design, using electrical-discharge machining (EDM) aided by the metal within the PCD. Alternatively, the articles themselves are supplied to tool makers, who then apply the final geometry and finish.

When a plurality of articles, potentially of different sizes and shapes, are to be blanked from a single disc, the articles are nested for maximum allocation. Allocation of articles to the disc is usually automatic, based on a predefined nesting program performed by a computer.

Allocating articles to defective portions of the disc leads to poor quality tool blanks.

It is an object of the invention to maximise the usable area of a disc for nesting allocation, whilst taking into account any defects on the disc may have on its surface or within the body.

SUMMARY OF THE INVENTION

In accordance with a first aspect of the invention, there is provided a method of machining articles from a disc comprising superhard material, the method comprising:
  Providing a disc to be machined, the disc having a diameter of no more than 100 mm and a thickness of no more than 10 mm;
  Providing a nesting pattern comprising one or more articles to be machined from a disc;
  Scanning the disc to identify non-defective and/or defective portions, said defective portions containing any one of more of the following: microstructural flaws, scratches, and compositional contaminants;
  Overlaying the nesting pattern onto defective and/or non-defective portions of the disc that were identified during scanning to create a machining program;
  Machining the one or more articles out of the disc according to the machining program.

Preferable and/or optional features of the first aspect of the invention are set forth in dependent claim 2.

In accordance with a second aspect of the invention, there is provided a computer program comprising computer readable code which, when run on a computer apparatus, causes the computer apparatus to perform the method in accordance with the first aspect of the invention.

In accordance with a third aspect of the invention, there is provided computer program product comprising a computer readable medium and a computer program in accordance with the second aspect of the invention, wherein the computer program is stored on the computer readable medium.

BRIEF DESCRIPTION OF THE DRAWINGS

The invention will now be more particularly described, by way of example only, with reference to the accompanying drawings, in which.

DETAILED DESCRIPTION

Figure 1:
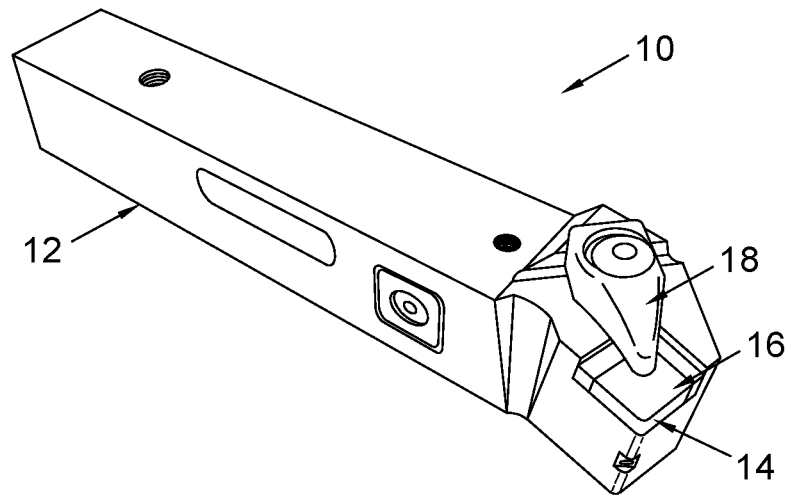
FIG. 1 is a perspective view of a prior art tool module.

Referring to FIG. 1, a prior art tool module is indicated generally at 10. The tool module 10 is connectable to a tool assembly (not shown) on, for example, a mill or a lathe. The tool module 10 comprises an elongate tool holder 12 and a removable cutting tool 14 detachably mounted at one end of the tool holder 12. This particular cutting tool 14 is square in plan view. The cutting tool 14 is held in place by a releasable clamp 16.

Figure 2:
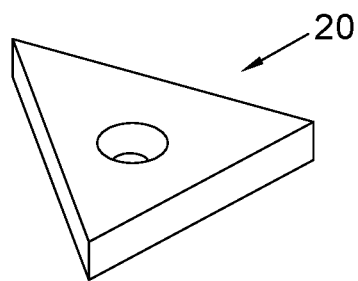
FIG. 2 is a perspective view of a prior art cutting tool.

An alternative prior art cutting tool, indicated at 18, is shown in FIG. 2. The cutting tool 16 is triangular in plan view, with a central through-hole 20.

The cutting tools 10, 18 are typically removed from a disc shaped sintered body, which is circular in plan view. To maximise the allocation of tools obtainable from the disc, nesting software is commonly used.

Figure 3:
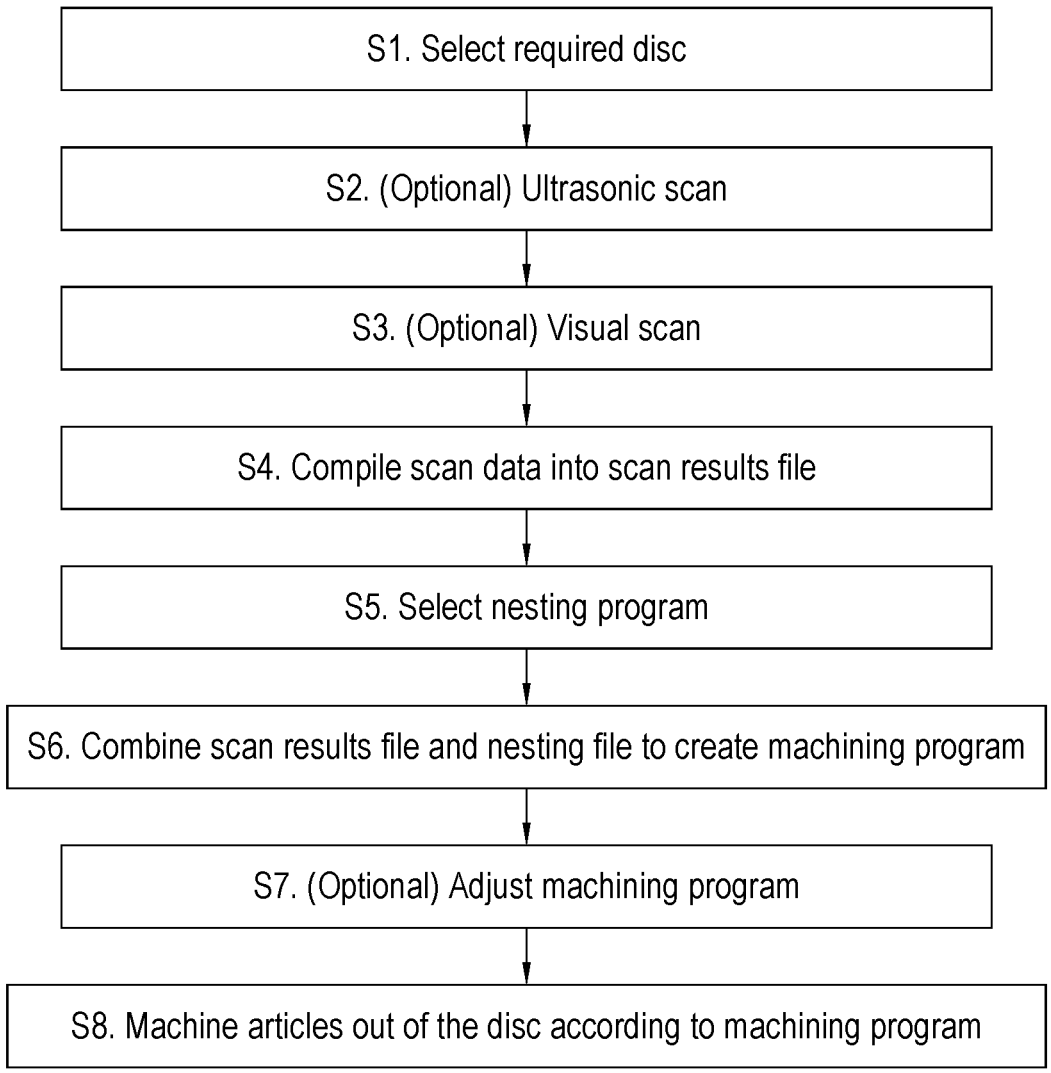
FIG. 3 is a flow diagram indicating the method to machine articles from a superhard disc in accordance with the invention.

FIG. 3 shows an exemplary method for machining articles from a superhard disc 22 in accordance with the invention. The following numbering corresponds to that of FIG. 3:

S1. Select the required disc 22. Only discs having a diameter of no more than 100 mm and a thickness of no more than 10 mm are suitable for use. The disc comprises sintered PCD. PCD is commonly consider an ultrahard material since it has a Vickers hardness over 80 GPa. Alternatively, may comprise sintered polycrystalline cubic boron nitride (PCBN) material. PCBN is commonly consider a superhard material since it has a Vickers hardness over 80 GPa.

Figure 4:
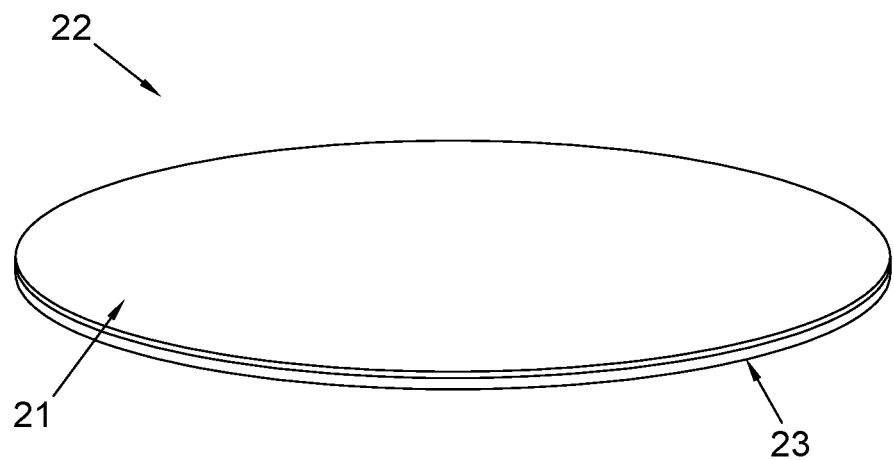
FIG. 4 is a perspective view of a superhard disc.

In this embodiment, and as best seen in FIG. 4, the disc 22 comprises a PCD layer 21 sinter joined to a tungsten carbide substrate 23. The disc 22 has a diameter of 76.5 mm, with an overall height of 1.6 mm. The PCD layer 21 is 0.5 mm thick.

Each disc 22 is assigned a unique number to identify it, and this identifier travels with the disc 22 throughout the process. Each disc 22 also has a reference point for disc orientation.

S2 & S3. The disc 22 is scanned in order to characterise the disc 22 and to determine its quality. Sometimes, the superhard disc 22 comprises non-defective portions 24 and also defective portions 26, best seen in FIG. 5. Defective portions 26 include a flaw or an unacceptable grade or quantity of flaw, whereas non-defective portions 24 include no flaws, or at worst an acceptable grade or quantity of flaw. The flaws can be variations in the layer with respect to the grade tolerance specification, scratches or polishing defects on the surface. Not all discs 22 comprise defective portions 26 but it is clearly beneficial to identify any flaws ahead of tool segments or blanks 28 removed from the disc. Machining tools made from defective tool segments are prone to premature failure in use, damaging the workpiece they are machining, and increasing spoilage.

Scanning may comprise visual scanning and/or ultrasonic scanning.

Visual scanning comprises the automated scanning of around 12,000 points on each disc. Initially, surface defects are determined from a visual inspection under magnification. Then the visually defective portions are marked on the disc surface and a visual defect camera takes a contrast image of the surface and outputs all 12,000 points with high or low values representing painted areas of the disc.

Ultra-sonic scanning measures the thickness of the disc, scans around 96,000 points with a depth of each point. Ultra-sonic scanning is also automated.

Scan data from each individual disc is logged for traceability. Each point contains X and Y positions, together with Z layer depth for ultra-sonic scanning.

Steps 2 and 3 may take place in either order. Scanning may optionally consist of only S2 or only S3. Preferably, the scanning step comprises both visual scanning and ultrasonic scanning.

S4. The scan data from visual scanning, ultrasonic scanning or both, is then compiled into a single scan results file. This is a digital file representing the scan data, for example, the file may be AutoCAD dxf file. The scan results file is unique to each disc and is not transferrable to or indicative of any other disc. The scan results file contains means to identify defects and to locate those defects. Alternatively, or additionally, the scan results file contains means to identify and optionally, to locate, non-defective portions of the disc.

Preferably, the scan data file(s) is(are) analysed automatically via macro and only locations indicating layer out of tolerance results and high contrast painted areas are plotted in dxf format.

Figure 5:
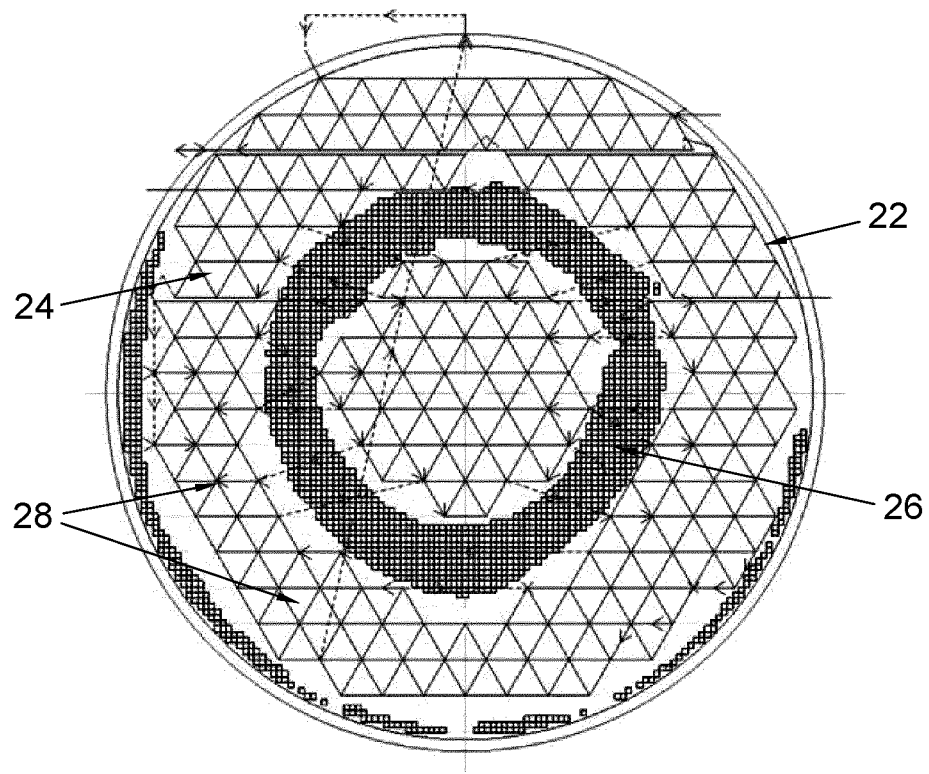
FIG. 5 is an image in accordance with the invention, showing the combination of proposed, nested cutting tools juxtaposed onto the disc ahead of cutting tool removal therefrom, and in particular indicating defective portions of the disc.

S5. Select the nesting file. Each pre-configured nesting file is different for each set of tool segments, depending on the size and the shape of the individual tool segments. The nesting file indicates the outline of one or more proposed tool segments, arranged on the disc for maximum usage of the disc, regardless of the quality of the disc material. In FIG. 5, the proposed tool segments 28 are triangular.

S6. Combine scan results and nesting pattern to help create a machining file. As indicated in FIG. 5, the proposed layout of nested tool segments 28 is juxtaposed onto the scan results. If the disc were to be used with any further intervention, tool segments 28 originating in the defection portions 26 of the disc 20 would result.

S7. Thus, the machining file may then be adjusted at this point. This step is preferably automated through software with some manual manipulation required. The tool segments 28 that would have been machined from the defective portions are removed from the machining program. Only tool segments 28 that fall within the non-defective portions 24 of the disc remain. Alternatively, the machining file may be adjusted to filter out the non-defection 24 portions of the disc 22.

S8. Tool segments 18 are machined out of the disc in accordance with the revised machining program, using wire EDM or laser cutting.

Depending on the process, tool segments 18 are then required to be cleaned.

Subsequently, each tool segment 18 is visually inspected to determine conformity with the approved drawing, before shipment to the customer.

In most cases, the customer would braze the tool segment 18 onto a particular machining tool. Alternatively, the tool segment 18 may be clamped in place as described previously with respect to FIG. 1.

It is imperative that the disc orientation is identical for both the machining program and the actual disc ahead of machining.

In summary, the inventors have found that the new process is more efficient in cutting and processing, and importantly, it saves on manual labour. Users have better control over the materials. Significantly, this process supports ISO certification and is a selling point for the end-user.

While this invention has been particularly shown and described with reference to embodiments, it will be understood by those skilled in the art that various changes in form and detail may be made without departing from the scope of the invention as defined by the appended claims.

The invention claimed is:

1. A method of machining articles from a disc comprising superhard material, the method comprising:
   Providing the disc to be machined, the disc having a diameter of no more than 100 mm and a thickness of no more than 10 mm;
   Providing a nesting pattern comprising one or more articles to be machined from the disc;
   Scanning the disc to identify non-defective and/or defective portions, said defective portions containing any one of more of the following: microstructural flaws, scratches, and compositional contaminants;
   Overlaying the nesting pattern onto defective and/or non-defective portions of the disc that were identified during scanning to create a first machining program;
   Machining the one or more articles out of the disc according to the first machining program, wherein scanning the disc comprises ultrasonically scanning the disc to generate ultrasonic scan data.

2. The method as claimed in claim 1, comprising identifying the non-defective portions of the disc using the ultrasonic scan data.

3. The method as claimed in claim 2, further comprising locating the non-defective portions of the disc using the ultrasonic scan data.

4. The method as claimed in claim 1, comprising identifying the defective portions of the disc using the ultrasonic scan data.

5. The method as claimed in claim 4, further comprising locating the defective portions of the disc using the ultrasonic scan data.

6. The method as claimed in claim 1, wherein scanning the disc comprises visually scanning the disc to generate visual scan data.

7. The method as claimed in claim 6, comprising identifying the non-defective portions of the disc using the visual scan data.

8. The method as claimed in claim 7, further comprising locating the non-defective portions of the disc using the visual scan data.

9. The method as claimed in claim 7, comprising identifying the defective portions of the disc using the visual scan data.

10. The method as claimed in claim 9, further comprising locating the defective portions of the disc using the visual scan data.

11. The method as claimed in claim 1, further comprising reviewing the first machining program file for the defective portions and subsequently modifying the first machining program to remove one or more articles that overlay any of the defective portions of the disc, thereby creating a second machining program file.

12. The method as claimed in claim 1, wherein the disc comprises polycrystalline diamond (PCD).

13. The method as claimed in claim 1, wherein the disc comprises polycrystalline cubic boron nitride (PCBN).

14. The method as claimed in claim 1, wherein the or each article is a cutting tip.

15. The method as claimed in claim 1, wherein the machining comprises wire electro-discharge machining.

16. The method as claimed in claim 1, wherein the machining comprises laser cutting.

* * * * *